United States Patent
Huang et al.

(10) Patent No.: US 12,252,438 B2
(45) Date of Patent: Mar. 18, 2025

(54) JOINT ADHESIVE FOR CELLULAR GLASS INSULATION

(71) Applicant: Owens Corning Intellectual Capital, LLC, Toledo, OH (US)

(72) Inventors: Helen Huang, New Albany, OH (US); Steven Badger, Pittsburgh, PA (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 319 days.

(21) Appl. No.: 17/688,974

(22) Filed: Mar. 8, 2022

(65) Prior Publication Data

US 2022/0289627 A1    Sep. 15, 2022

Related U.S. Application Data

(60) Provisional application No. 63/158,977, filed on Mar. 10, 2021.

(51) Int. Cl.
*C03C 27/04* (2006.01)
*C03C 11/00* (2006.01)

(52) U.S. Cl.
CPC ............ *C03C 27/048* (2013.01); *C03C 11/00* (2013.01)

(58) Field of Classification Search
CPC ...... C03C 27/048; C03C 11/00; C03C 11/007
USPC .......................................................... 156/334
See application file for complete search history.

(56) References Cited

U.S. PATENT DOCUMENTS

| | | | |
|---|---|---|---|
| 4,623,585 A * | 11/1986 | Linton | F16L 59/024 |
| | | | 428/317.1 |
| 5,919,563 A | 7/1999 | Parish, Jr. et al. | |
| 6,740,375 B1 | 5/2004 | Sagisaka et al. | |
| 8,372,909 B2 | 2/2013 | Becker et al. | |
| 8,734,939 B2 | 5/2014 | Herr et al. | |
| 8,858,743 B2 | 10/2014 | Linnenbrink et al. | |
| 9,085,708 B2 | 7/2015 | Becker et al. | |
| 9,157,238 B2 | 10/2015 | Linnenbrink et al. | |
| 9,404,004 B2 | 8/2016 | Czaplewski et al. | |
| 10,005,207 B2 | 6/2018 | Kastell et al. | |
| 10,195,820 B2 | 2/2019 | Zaddack et al. | |
| 10,513,639 B2 | 12/2019 | Takamori | |
| 10,781,976 B2 * | 9/2020 | Fay | F16L 59/141 |
| 2004/0081795 A1 | 4/2004 | Wang et al. | |

(Continued)

FOREIGN PATENT DOCUMENTS

| | | |
|---|---|---|
| EP | 2657302 A1 | 10/2013 |
| EP | 1680467 B1 | 8/2014 |
| WO | 03033612 A1 | 4/2003 |
| WO | 2014205336 A2 | 12/2014 |
| WO | 2021041819 A1 | 3/2021 |

OTHER PUBLICATIONS

Sustic, A., "Amorphous Poly Alpha Olefin (APAO) Based Hot Melts", www.rextac.com, Apr. 18, 2016. (Year: 2016).*

(Continued)

*Primary Examiner* — S. Behrooz Ghorishi
*Assistant Examiner* — Gregory C. Grosso
(74) *Attorney, Agent, or Firm* — Calfee, Halter & Griswold LLP

(57) ABSTRACT

A cellular glass system for insulating an outer surface of a fluid carrying or storing vessel, such as a pipe, is disclosed. The system is comprised of segments of cellular glass insulation. A sealant is provided at the interface between adjacent cellular glass segments to seal the system from moisture and thermal intrusion.

16 Claims, 8 Drawing Sheets

(56) References Cited

U.S. PATENT DOCUMENTS

| | | | |
|---|---|---|---|
| 2008/0287574 | A1 | 11/2008 | Loth et al. |
| 2010/0028668 | A1 | 2/2010 | Janda et al. |
| 2010/0084431 | A1 | 4/2010 | Miller et al. |
| 2013/0157048 | A1 | 6/2013 | Rudolf |
| 2016/0207283 | A1 | 7/2016 | Wang et al. |
| 2016/0305063 | A1 | 10/2016 | Rule et al. |
| 2017/0292047 | A1 | 10/2017 | Sustic et al. |
| 2018/0029304 | A1 | 2/2018 | Pauli et al. |
| 2018/0311929 | A1 | 11/2018 | Mason et al. |
| 2018/0320824 | A1 | 11/2018 | Fay et al. |
| 2019/0331286 | A1* | 10/2019 | Parks .................. F16L 59/022 |
| 2019/0353356 | A1 | 11/2019 | Fischer |
| 2019/0366683 | A1 | 12/2019 | Zaddack et al. |
| 2020/0001568 | A1 | 1/2020 | Wei et al. |

OTHER PUBLICATIONS

Mourad, A. et al., "Characterisation of Thermally Treated and Untreated Polyethylene-Polypropylene Blends Using DSC, TGA and IR Techniques", Plastics, Rubber and Composites, vol. 38, No. 7, pp. 265-278, (2009). (Year: 2009).*

INEOS, "Typical Engineering Properties of Polypropylene", INEOS Olefins & Polymers USA, www.ineos-op.com, Apr. 2014. (Year: 2014).*

FOAMGLAS Technical Newsletter, Owens Corning, Pub. No. 10024538, Nov. 12, 2020. (Year: 2020).*

Sustic, A., "Amorphous Poly Alpha Olefin (APAO) Based Hot Melts", www.rextac.com, Apr. 18, 2016, (See NPL document filed on May 10, 2024). (Year: 2016).*

Mourad, A. et al., "Characterisation of Thermally Treated and Untreated Polyethylene-Polypropylene Blends Using DSC, TGA and IR Techniques", Plastics, Rubber and Composites, vol. 38, No. 7, pp. 265-278, (2009), (See NPL document filed on May 10, 2024). (Year: 2009).*

INEOS, "Typical Engineering Properties of Polypropylene", INEOS Olefins & Polymers USA, www.ineos-op.com, Apr. 2014, (See NPL document filed on May 10, 2024). (Year: 2014).*

FOAMGLAS Technical Newsletter, Owens Corning, Pub. No. 10024538, Nov. 12, 2020, (See NPL document filed on May 10, 2024). (Year: 2020).*

International Search Report & Written Opinion from PCT/US2022/019224 dated Jul. 11, 2022.

* cited by examiner

JOINT ADHESIVE FOR CELLULAR GLASS INSULATION

RELATED APPLICATIONS

This application claims priority to and any benefit of U.S. Provisional Application No. 63/158,977, filed Mar. 10, 2021, the content of which is incorporated herein by reference in its entirety.

FIELD

The present invention relates to insulation systems for pipes and vessels, and more particularly, to systems that avoid the problems associated with conventional joint adhesives in pipe insulation applications.

BACKGROUND

Conventional pipe insulation may be made from a variety of materials ranging from flexible materials such as plastics and foam rubbers to those that are more rigid such as thermosetting plastics and cellular glass (also called foam glass).

Cellular glass is a preferred choice for certain insulation applications due to its ability to maintain its shape under strenuous conditions including cryogenic temperatures as well as its closed-cell makeup, making it impermeable to vapor. Due to its rigid structure, cellular glass is often fabricated into sections for insulating industrial and commercial pipes or vessels. These sections are then assembled around the pipe to provide insulation. However, as the cellular glass is applied in sections, gaps or joints between the individual segments must be sealed to complete the insulation. Conventional joint adhesives for cellular glass insulation often relied on asphalt (bitumen) mixtures. However, the use of such mixtures has drawbacks (e.g., flammability and health concerns).

SUMMARY

The general inventive concepts are based, in part, on the recognition that conventional, asphalt-based joint adhesives cannot meet the needs of all cellular glass insulation systems. Despite several properties that coincide with the needs of cellular glass insulation, a need exists for a replacement joint adhesive that retains the positive characteristics of asphalt while avoiding its known drawbacks. Applicants have discovered that amorphous poly alpha-olefin (APAO) adhesives can deliver such properties. In certain exemplary aspects, the system for insulating a pipe according to the general inventive concepts is suitable for insulation of pipes and vessels to a temperature of −160° C. or below, including temperatures of −192° C.

In certain exemplary aspects, the general inventive concepts contemplate a cellular glass insulation system for insulating a pipe at cryogenic temperatures, the system comprising a plurality of cellular glass insulation segments and an amorphous poly alpha-olefin (APAO) adhesive. Each of the cellular glass insulation segments comprises two side joint sections that extend the length of the segment, an inner pipe bore, and two end joint sections; the APAO adhesive is applied at an interface between adjacent cellular glass insulation segments. The APAO adhesive meets at least one of the following criteria: has an onset of melt of from about 20° C. to about 75° C.; and has a differential movement between the adhesive and the cellular glass of from about 10 mm/m to about 25 mm/m.

In certain exemplary aspects, the general inventive concepts contemplate a method of insulating a pipe. The method comprises providing a first cellular glass insulation segment, a second cellular glass segment, and an amorphous poly alpha-olefin (APAO) adhesive. Each of the first cellular glass insulation segment and the second cellular glass segment having a length an inner pipe bore, side joint sections extending the length of the cellular glass insulation segment between the inner pipe bore and an exterior surface of the cellular glass insulation segment, applying the APAO adhesive along an interface between the first cellular glass insulation segment and the second cellular glass insulation segment, and positioning the cellular glass insulation segments about the exterior of a pipe or vessel. The APAO adhesive meets at least one of the following criteria has an onset of melt of from about 20° C. to about 75° C.; and has a differential movement between the adhesive and the cellular glass of from about 10 mm/m to about 25 mm/m.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
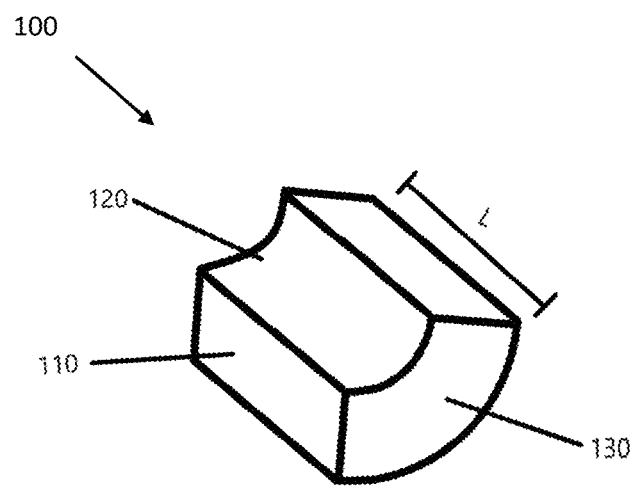
FIG. 1 shows a diagram of a conventional segment of cellular glass insulation.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

While various exemplary embodiments are described or suggested herein, other exemplary embodiments utilizing a variety of methods and materials similar or equivalent to those described or suggested herein are encompassed by the general inventive concepts.

Unless defined otherwise, all technical and scientific terms used herein have the same meaning as commonly understood by one of ordinary skill in the art to which the invention belongs. In this connection, unless otherwise indicated, concentrations of ingredients given in this document refer to the concentrations of these ingredients in the master batch or concentrate, in keeping with customary practice.

The general inventive concepts relate to systems for and methods of insulating a pipe or similar structure using cellular glass. While the discussion presented herein is focused on pipe insulation, those of ordinary skill in the art will recognize the applicability of the cellular glass insulation systems described herein is not limited to pipe insulation applications, but is also applicable to, for example, a tank base or related liquefaction equipment and vessels. Thus, the discussion of the individual embodiments described herein should not be limited to pipe insulation, but applies equally to for example, a tank base or related liquefaction equipment and vessels.

In certain exemplary aspects, the general inventive concepts contemplate a cellular glass insulation system for insulating a pipe at cryogenic temperatures, the system comprising a plurality of cellular glass insulation segments and an amorphous poly alpha-olefin (APAO) adhesive. Each of the cellular glass insulation segments comprises two side joint sections that extend the length of the segment, an inner pipe bore, and two end joint sections; the APAO adhesive is applied at an interface between adjacent cellular glass insulation segments. The APAO adhesive meets at least one of the following criteria: has an onset of melt of from about 20° C. to about 75° C.; and has a differential movement between the adhesive and the cellular glass of from about 10 mm/m to about 25 mm/m.

In certain exemplary aspects, the general inventive concepts contemplate a method of insulating a pipe. The method comprises providing a first cellular glass insulation segment, a second cellular glass segment, and an amorphous poly alpha-olefin (APAO) adhesive. Each of the first cellular glass insulation segment and the second cellular glass segment having a length an inner pipe bore, side joint sections extending the length of the cellular glass insulation segment between the inner pipe bore and an exterior surface of the cellular glass insulation segment, applying the APAO adhesive along an interface between the first cellular glass insulation segment and the second cellular glass insulation segment, and positioning the cellular glass insulation segments about the exterior of a pipe or vessel. The APAO adhesive meets at least one of the following criteria has an onset of melt of from about 20° C. to about 75° C.; and has a differential movement between the adhesive and the cellular glass of from about 10 mm/m to about 25 mm/m.

Cellular glass is a non-porous closed-cell foam material that is rigid in structure and has a water permeability of zero. Having such a low permeability means that cellular glass will not allow water into a system that is properly sealed, making it ideal for use where water vapor should be kept at a minimum. However, because cellular glass is not flexible, in order to form customized insulation products (e.g., pipe insulation), cellular glass must be formed into fabricated sections (e.g., half sections, quarter sections, or other discrete segments) that fit around the exterior of the pipe.

While the general inventive concepts are applicable to a variety of insulation systems, the cellular glass for use according to the general inventive concepts is characterized by a stable thermal conductivity that does not substantially change when exposed to extreme environmental conditions (e.g., cryogenic applications). The cellular glass insulation is uniquely characterized within the insulation market since the product is formed using an insulating cell gas composition that cannot escape the glass structure. Those of ordinary skill in the art will recognize that different cellular glass densities and thickness will provide different properties and performance. The general inventive concepts are related to increasing performance of the combination of cellular glass and adhesive to prevent or mitigate drawbacks of conventional cellular glass-adhesive combinations.

In order to avoid undermining the thermal characteristics of a cellular glass installation, the insulation system needs to effectively seal the joints between individual cellular glass segments. Such a sealant (the terms "adhesive" and "sealant" as used herein, are intended to be interchangeable as the sealants according to the general inventive concepts provide both sealant and adhesive properties to the system) must provide a vapor/insulative barrier despite the extreme environmental conditions under which cellular glass systems are often used. Conventional insulation systems typically use an asphalt-based sealant. While asphalt has many of the properties that make a suitable sealant for use with cellular glass, it is not without its drawbacks. For instance, asphalt-based systems are subject to environmental health and safety regulations requiring permitting, making their use more problematic in some instances. Thus, there is a need for an effective replacement sealant that exhibits good sealant and insulative properties under tough environmental conditions, that is compatible with cellular glass insulation, and that lacks the drawbacks of conventional, asphalt-based sealants.

The sealant closes off the joint between adjacent cellular glass segments. The sealant is generally applied to the joint sections, which are then mated together around the pipe, compressing the sealant between the insulation segments. In addition, the sealant must penetrate the fine cell structure of the cellular glass surface to provide a tight seal. The cell structure of the cellular glass insulation is generally less than 2 mm per cell. The sealant is effective at adhering the individual segments of cellular glass together and forming a barrier to prevent vapor intrusion and thermal conduction at the joints.

In one exemplary aspect, the general inventive concepts contemplate the use of an amorphous poly alpha-olefin adhesive for use with a cellular glass insulation system. In certain exemplary aspects, the system comprises a plurality of cellular glass segments, each having several joint sections, and an amorphous poly alpha-olefin adhesive applied to a juncture where two adjacent cellular glass segments come together when assembled about a pipe. The amorphous poly alpha-olefin adhesive should demonstrate good adhesive properties while also having overall good dimensional stability during temperature change (or, dimensional stability that mimics that of cellular glass), and low water vapor permeability. Non-limiting examples of suitable amorphous poly alpha-olefin adhesive type hot-melt adhesives include ethyl vinyl acetate (EVA), polyolefin (PO), polyamide (PA), and amorphous poly-alpha-olefin (APAO) polymers and copolymers.

In an exemplary aspect of the general inventive concepts, the non-asphalt adhesive is an amorphous poly alpha-olefin adhesive (APAO)-type adhesive. Amorphous poly alpha olefins (also referred to as atactic poly alpha olefins) are generally, but not exclusively, polymers of propylene and/or copolymers of propylene and ethylene. In certain exemplary aspects of the general inventive concepts, the APAO adhesive has an onset of melt of less than 75° C., including from 20° C. to about 75° C. In certain exemplary aspects, the APAO adhesive has an onset of melt of from 25° C. to about 75° C. In certain exemplary aspects, the APAO adhesive has an onset of melt of from 30° C. to about 75° C. In certain exemplary aspects, the APAO adhesive has an onset of melt of from 35° C. to about 75° C. In certain exemplary aspects, the APAO adhesive has an onset of melt of from 25° C. to about 70° C. In certain exemplary aspects, the APAO adhesive has an onset of melt of from 25° C. to about 65° C. In certain exemplary aspects, the APAO adhesive has an onset of melt of from 25° C. to about 60° C. In certain exemplary aspects, the APAO adhesive has an onset of melt of from 25° C. to about 55° C. In certain exemplary aspects, the APAO adhesive has an onset of melt of from 25° C. to about 50° C. In certain exemplary aspects, the APAO adhesive has an onset of melt of from 25° C. to about 45° C.

As mentioned, dimensional stability of an insulation system (including the adhesive) is an important property for cryogenic applications. As the insulation system cools, the individual components (i.e., cellular glass segments and adhesives) tend to shrink or contract. If the difference in rate of change relative to temperature (i.e., coefficient of thermal expansion) for the individual materials is too great, the seals created by the adhesive may fail due to the stress created by different contraction rates. One way of describing the relative contraction rates for two materials is differential movement.

The term "differential movement," as used herein, refers to the difference in the calculated thermal expansion of an adhesive material relative to that of cellular glass. More particularly, as used herein differential movement refers to the thermal movement (expansion) of an adhesive (from a predetermined temperature (e.g., −165° C.) to its onset of melt temperature) minus the thermal movement (expansion) of cellular glass from the predetermined temperature to ambient temperature (25° C.).

The coefficient of thermal expansion (having units of $\mu m/(m° C.)$) is multiplied by the temperature range. This provides the total "movement" of the material over the thermal range. Cellular glass which has a CTE of 6.6 $\mu m/(m° C.)$ which provides a movement value of 1.254 over the range of −165 to 25° C. In certain exemplary aspects, the differential movement between the adhesive and the cellular glass (adhesive-CG) is less than about 25 mm/m. In certain exemplary aspects, the APAO adhesive has a differential movement of about 10 mm/m to about 25 mm/m. In certain exemplary aspects, the APAO adhesive has a differential movement of about 10 mm/m to about 23 mm/m. In certain exemplary aspects, the APAO adhesive has a differential movement of about 12 mm/m to about 25 mm/m. In certain exemplary aspects, the APAO adhesive has a differential movement of about 12 mm/m to about 23 mm/m. In certain exemplary aspects, the APAO adhesive has a differential movement of about 12 mm/m to about 21 mm/m. In certain exemplary aspects, the APAO adhesive has a differential movement of about 12 mm/m to about 16 mm/m. In certain exemplary aspects, the APAO adhesive has a differential movement of about 12 mm/m to about 15 mm/m.

FIG. 1 shows an exemplary ¼ segment of cellular glass pipe insulation 100. While the segment is illustrated herein as a quarter segment of an annular insulation system (i.e., one that fits around approximately ¼ of the exterior circumference of a pipe), those of ordinary skill will understand that a variety of segment combinations and shapes are contemplated and would be suitable for use according to the general inventive concepts. Accordingly, it is not intended that the general inventive concepts be limited to those specific embodiments described herein. The cellular glass pipe insulation is defined by a length L, and has a pair of side joint sections 110, an inner pipe bore 120, and a pair of end joint sections 130. The inner pipe bore 120 defines the area in which the pipe will be positioned with or against the cellular glass pipe insulation segments positioned around thew pipe. For example, the inner pipe bore is adapted for fitting around an arc of the exterior circumference of the pipe (or in certain aspects, around an inner layer of insulation including, but not limited to, an inner layer of cellular glass insulation). The side joint sections are substantially flat and extend the length of the cellular glass pipe insulation segment between the inner pipe bore and the exterior of the cellular glass pipe insulation segment. The end joint sections are situated on opposite ends of the cellular glass pipe insulation segment. During installation, the individual insulation segments are fitted about the pipe and a sealant is provided along the joint sections where two segments meet, that is both the side joint sections and the end joint sections.

Figure 2:
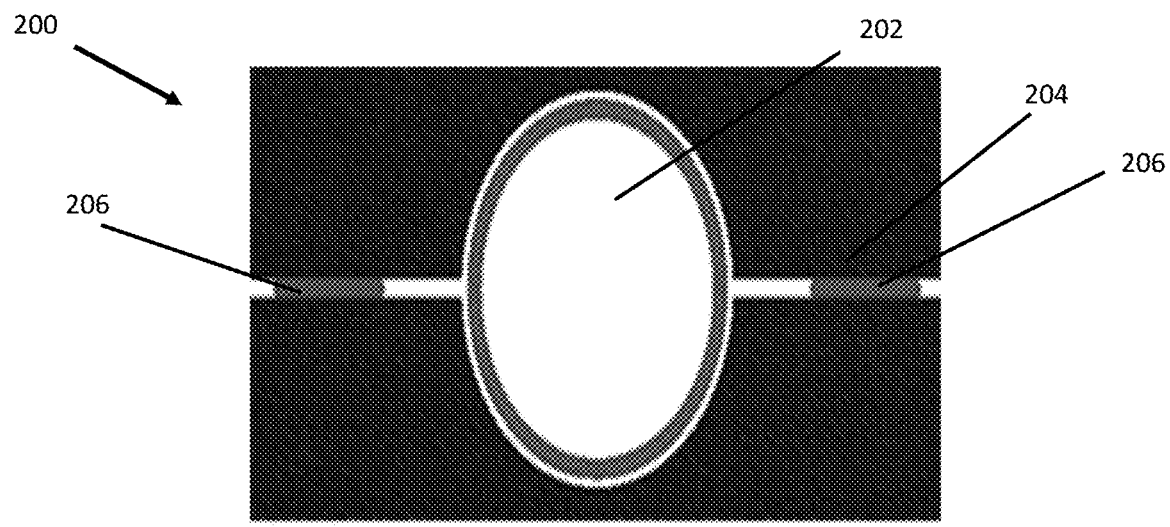
FIG. 2 shows a diagram of a cellular glass insulation system comprising cellular glass segments positioned around a pipe with a non-asphalt hot-melt adhesive (i.e., an amorphous poly alpha-olefin adhesive) positioned in a joint/interface between the cellular glass segments.

FIG. 2 shows a cellular glass pipe insulation system. In this embodiment, a pipe 202, is substantially surrounded by two segments of cellular glass insulation 204. The interface where the foam glass segments meet is coated with a non-asphalt hot-melt adhesive 206.

Figure 3:
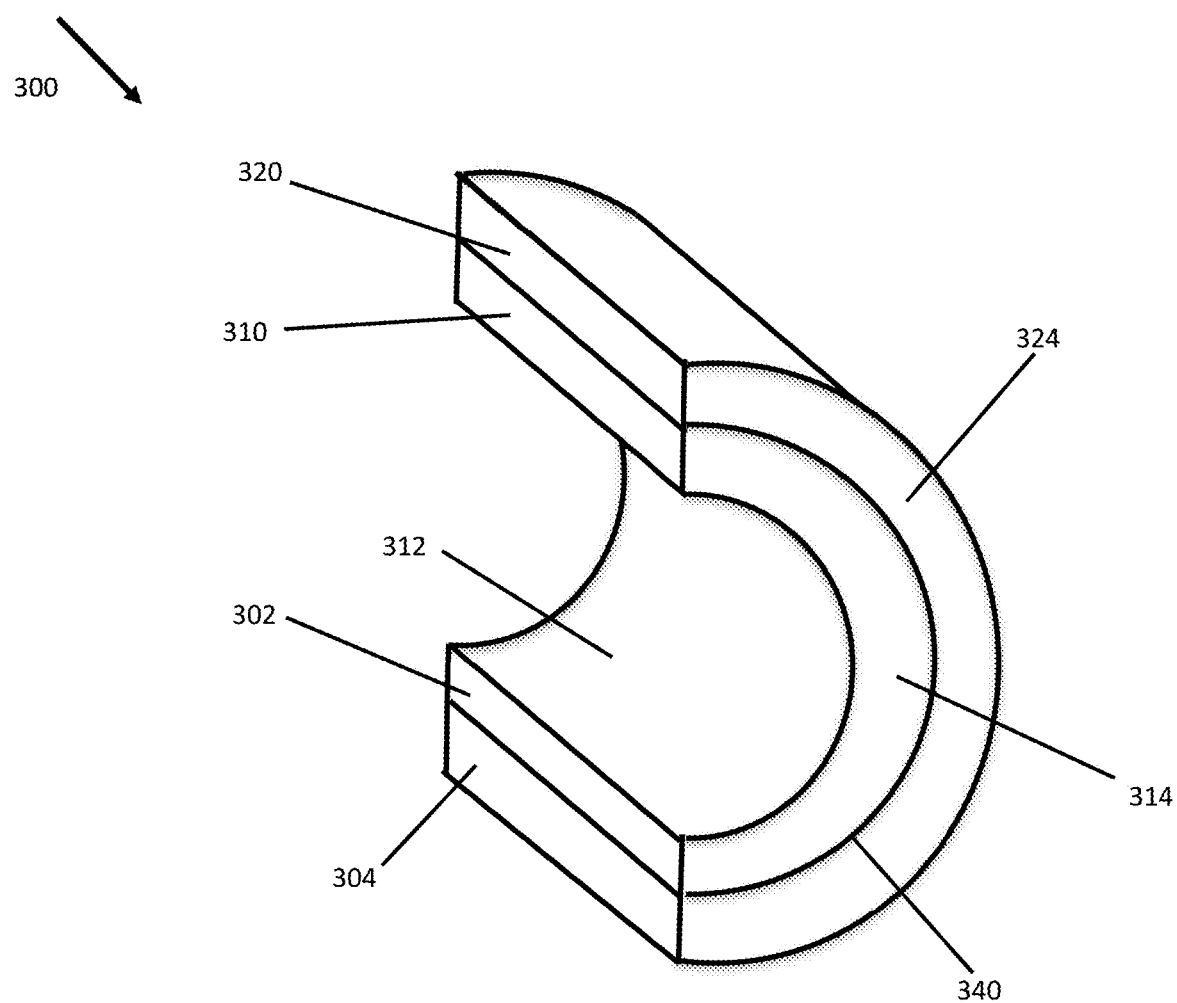
FIG. 3 shows a diagram of a multilayer cellular glass insulation system.

FIG. 3 shows a multilayer cellular glass pipe insulation system 300. The segment is comprised of two layers 302, 304 of cellular glass insulation. The inner layer 302 comprises side joint sections 310, an inner pipe bore 312, and end joint sections 314, which define a first outer circumference. The outer layer 304 comprises side joints sections 320, an inner pipe bore 322 (covered by the first outer circumference of the inner layer in FIG. 3), and end joint sections 324, which define a second outer circumference. The inner layer is fitted around the pipe with a sealant disposed at the interfaces (i.e., joints) between two adjacent segments. The outer layer is positioned around the first outer circumference of the inner layer of cellular glass insulation at an interface 340 between the two layers. In certain aspects, the segments are compressed together to improve the seal on the joint. In certain aspects, only one layer of the cellular glass insulation system is sealed with a non-asphalt hot-melt adhesive according to the general inventive concepts. In certain aspects, each layer of the cellular glass insulation system is sealed with a non-asphalt hot-melt adhesive according to the general inventive concepts, including aspects that incorporate more than two layers of cellular glass insulation.

While not wishing to be bound by theory, it is believed that cryogenic behavior (e.g., coefficient of thermal expansion) is a key property when identifying a suitable adhesive for use in pipe insulation. For instance, if an adhesive contracts at a significantly different rate during (e.g., during cooling to cryogenic temperatures) than cellular glass, then it may cause the joints to fail due to separation of the materials. By using a non-asphalt hot-melt adhesive that mimics the cryogenic behavior of the cellular glass (or closely adheres thereto) improved sealing can be achieved over a larger thermal range. The improved sealing also provides a strong mechanical bond between both the adjacent segments of sealed insulation and to the pipe or vessel substrate.

As previously mentioned, the general inventive concepts contemplate compositions and methods of insulating a pipe. The compositions comprise segments of cellular glass insulation and a non-asphalt hot-melt adhesive/sealant (e.g., APAO) applied to a joint or interface between cellular glass segments. The method comprises providing a cellular glass insulation segment and an APAO adhesive according to the general inventive concepts. The cellular glass insulation segment has a length, and comprises an inner pipe bore, side joint sections extending the length of the cellular glass insulation segment between the inner pipe bore and an exterior of the cellular glass insulation segment, and end joint sections. The sealant is applied along an interface between individual cellular glass insulation segment joint sections (i.e., side and end joint sections), and the cellular glass insulation segments are positioned about the exterior of a pipe. In certain exemplary aspects, the APAO adhesive is applied to more than one joint section of the cellular glass insulation segment, including each joint section.

The following examples illustrate features and/or advantages of the compositions and methods according to the general inventive concepts. The examples are given solely for the purpose of illustration and are not to be construed as limitations of the general inventive concepts, as many variations thereof are possible without departing from the spirit and scope of the general inventive concepts.

Example 1: A series of hot melt adhesives were analytically tested for chemical composition under infrared. The results are as follows:

Sample 1 included polypropylene, polyethylene, and calcium stearate and is also identified by the manufacturer to include an ethene homopolymer.

Sample 2 included polypropylene, polyethylene, and calcium stearate.

Sample 3 was found to be made up of primarily polypropylene.

Sample 4 was found to include poly(ethylene/vinyl acetate) and poly(ester) terephthalate.

Sample 5 was found to include poly(ethylene) and poly(ester) terephthalate.

Example 2: Samples 1-5 were tested for viscosity at either 350° F. and 375° F. or both. The results are shown in Table 1 below.

TABLE 1

| Sample Number | Viscosity at 350° F. (cps) | Viscosity at 375° F. (cps) |
|---|---|---|
| 1 | 2150 | 1500 |
| 2 | 4500 | 3500 |
| 3 |  | 3500 |

Example 3: In order to identify an adhesive that will work in concert with the cellular glass insulation during temperature changes, the adhesives were analyzed to determine their coefficient of thermal expansion over a range of temperatures. Samples 1-3 and 5 were tested for coefficient of thermal expansion (CTE). The results are summarized in Table 2 below.

TABLE 2

| Sample No. | 1st CTE (μm/(m ° C.)) | 2nd CTE (μm/(m ° C.)) | 3rd CTE (μm/(m ° C.)) | Onset of melt ° C. |
|---|---|---|---|---|
| 1 | 59.8 (−163 to −31° C.) | 108.2 (−18 to 14° C.) | N/A | 40.1 |
| 2 | 59.4 (−160 to −30° C.) | 177.9 (−19 to 18° C.) | 302.9 (27 to 37° C.) | 41.6 |
| 3 | 59.7 (−156 to −41° C.) | 195 (−23 to 11° C.) | N/A | 26.3* |
| 5 | 62.1 (−157 to −36° C.) | 124.7 (−30 to 32° C.) | 460.9 (45 to 79° C.) | 86.5 |
| Asphalt | 56.2 (−154 to −82° C.) | 77.9 (−70 to −41° C.) | 146.8 (−20 to 8° C.) | 22.3 |

*sample showed a substantial "shoulder" in the data leading to this value.

Example 4: Table 3 shows the results of calculated total movement and differential movement for a series of hot melt adhesives and asphalt.

TABLE 3

| Sample 1 | | | | |
|---|---|---|---|---|
| Onset of melt (° C.) | 40.1 | Temp Diff | Movement (μm/(m) | Total movement (mm/m) |
| Ave CTE (μm/(m ° C.) | 59.8 (−163 to −31° C.) | 134 | 8013.2 | 15.71 |
|  | 108.2 (−18 to 14° C.) | 45 | 4869 | |
|  | to onset T | 26.1 | 2824.02 | |
| Temp Diff −165 to onset of Melt | 205.1 | | | |
| Diff movement adhesive-FG (mm/m) | 14.45 | | | |

| Sample 2 | | | | |
|---|---|---|---|---|
| Onset of melt (° C.) | 41.6 | Temp Diff | Movement (μm/(m) | Total movement (mm/m) |
| Ave CTE (μm/(m ° C.) | 59.4 (−160 to −30° C.) | 135 | 8019 | 23.70664 |
|  | 177.9 (−19 to 18° C.) | 48 | 8539.2 | |
|  | 302.9 (27 to 37° C.) | 19 | 5755.1 | |
|  | to onset T | 4.6 | 1393.34 | |

TABLE 3-continued

| | |
|---|---|
| Temp Diff −165 to onset of Melt | 206.6 |
| Diff movement adhesive-FG (mm/m) | 22.43 |

Sample 3

| | | Temp Diff | Movement (μm/(m) | Total movement (mm/m) |
|---|---|---|---|---|
| Onset of melt (° C.) | 26.3 | | | |
| Ave CTE (μm/(m ° C.) | 59.7 (−156 to −41° C.) | 124 | 7402.8 | 20.5263 |
| | 195 (−23 to 11° C.) | 52 | 10140 | |
| | to onset T | 15.3 | 2983.5 | |
| Temp Diff −165 to onset of Melt | 191.3 | | | |
| Diff movement adhesive-FG (mm/m) | 19.27 | | | |

Sample 5

| | | Temp Diff | Movement (μm/(m) | Total movement (mm/m) |
|---|---|---|---|---|
| Onset of melt (° C.) | 86.5 | | | |
| Ave CTE (μm/(m ° C.) | 62.1 (−157 to −36° C.) | 129 | 8010.9 | 41.60955 |
| | 124.7 (−30 to 32° C.) | 68 | 8479.6 | |
| | 460.9 (45 to 79° C.) | 47 | 21662.3 | |
| | to onset T | 7.5 | 3456.75 | |
| Temp Diff −165 to onset of Melt | 251.5 | | | |
| Diff movement adhesive-FG (mm/m) | 40.36 | | | |

Asphalt

| | | Temp Diff | Movement (μm/(m) | Total movement (mm/m) |
|---|---|---|---|---|
| Onset of melt (° C.) | 22.3 | | | |
| Ave CTE (μm/(m ° C.) | 56.2 (−154 to −82° C.) | 83 | 4664.6 | 17.15094 |
| | 77.9 (−70 to −41° C.) | 41 | 3193.9 | |
| | 146.8 (−20 to 8° C.) | 49 | 7193.2 | |
| | to onset T | 14.3 | 2099.24 | |
| Temp Diff −165 to onset of Melt | 187.3 | | | |
| Diff movement adhesive-FG (mm/m) | 15.9 | | | |

Figure 4:
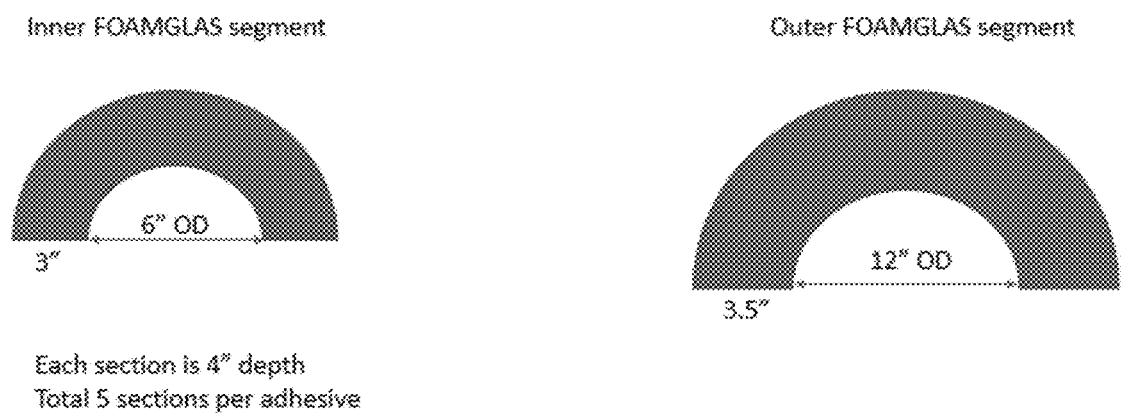
FIG. 4 shows a diagram of exemplary cellular glass segments produced for testing cryogenic performance of adhesives.

Example 5: A series of hot melt adhesives were applied to annular cellular glass segments. The samples were subjected to cold cycles. Two sizes of foam glass segment were produced, the first is an "inner" pipe section consisting of a halfmoon segment having a 6" inner diameter (to fit around a 6" pipe) and which is 3" in thickness (FIG. 4). The second pipe has a 12" inner diameter (to fit around the pipe and the "inner" cellular glass insulation) and which is 3.5" inches in thickness. A total of four joints are adhered with each individual adhesive (adhering joints between 5 cellular glass segments for a total of four joints per adhesive) to form a line of cellular glass blocks.

Figure 5:
FIG. 5 shows an image of an outer layer of a multilayer cellular glass insulation system prepared to test cryogenic performance of adhesives.
Figure 6:
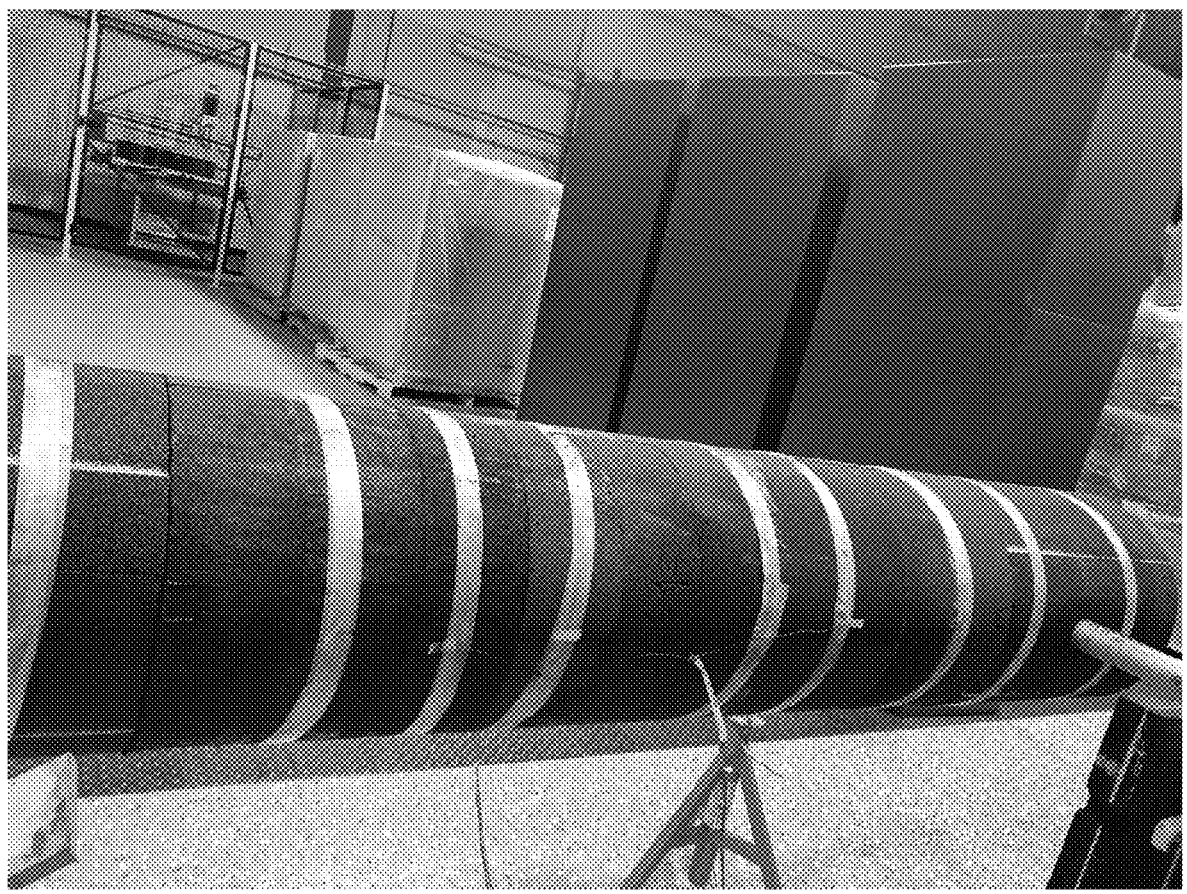
FIG. 6 shows an image of an inner layer of a multilayer a multilayer cellular glass insulation system prepared to test cryogenic performance of adhesives.

Once assembled around the pipe, the samples are then cooled by running liquid nitrogen through the pipe (FIG. 5). Two tests are run with target temperatures on the pipe touching inner adhesive joint pieces of −165° C. and −192° C. The temperature reduction rate was −1.5° C./min—which took 3 hours to reach target. The hold time at this temperature was 7.5 hours (in between layers didn't reach equilibrium at 3.5 hours out of the 4-hour hold originally set, so extended the hold time by 4 hours to 7.5 hours total. The temperature of the most inner and in between layer (inner and outer cellular glass insulation) in the center of each adhesive joint assembly was recorded.

Figure 7:
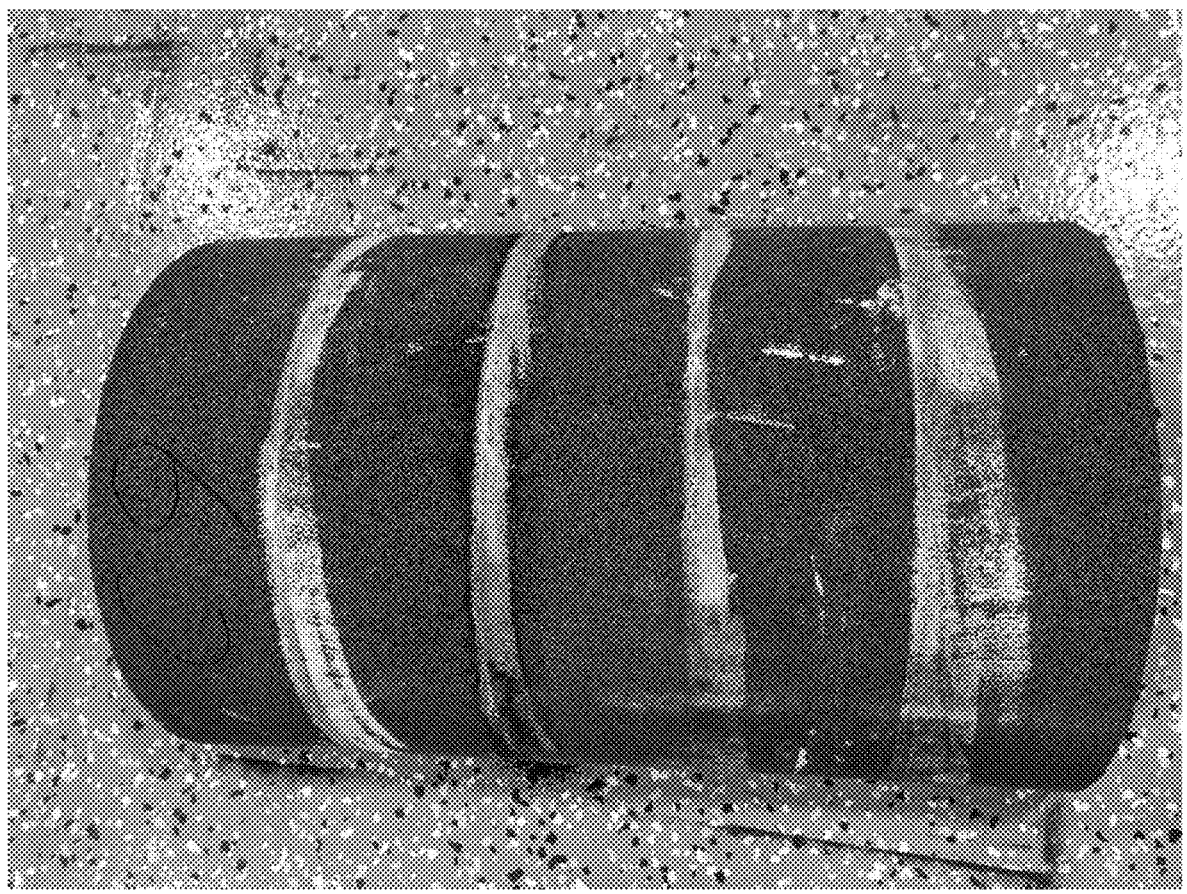
FIG. 7 shows an image of joints treated with an adhesive prior to cryogenic performance testing.
Figure 8:
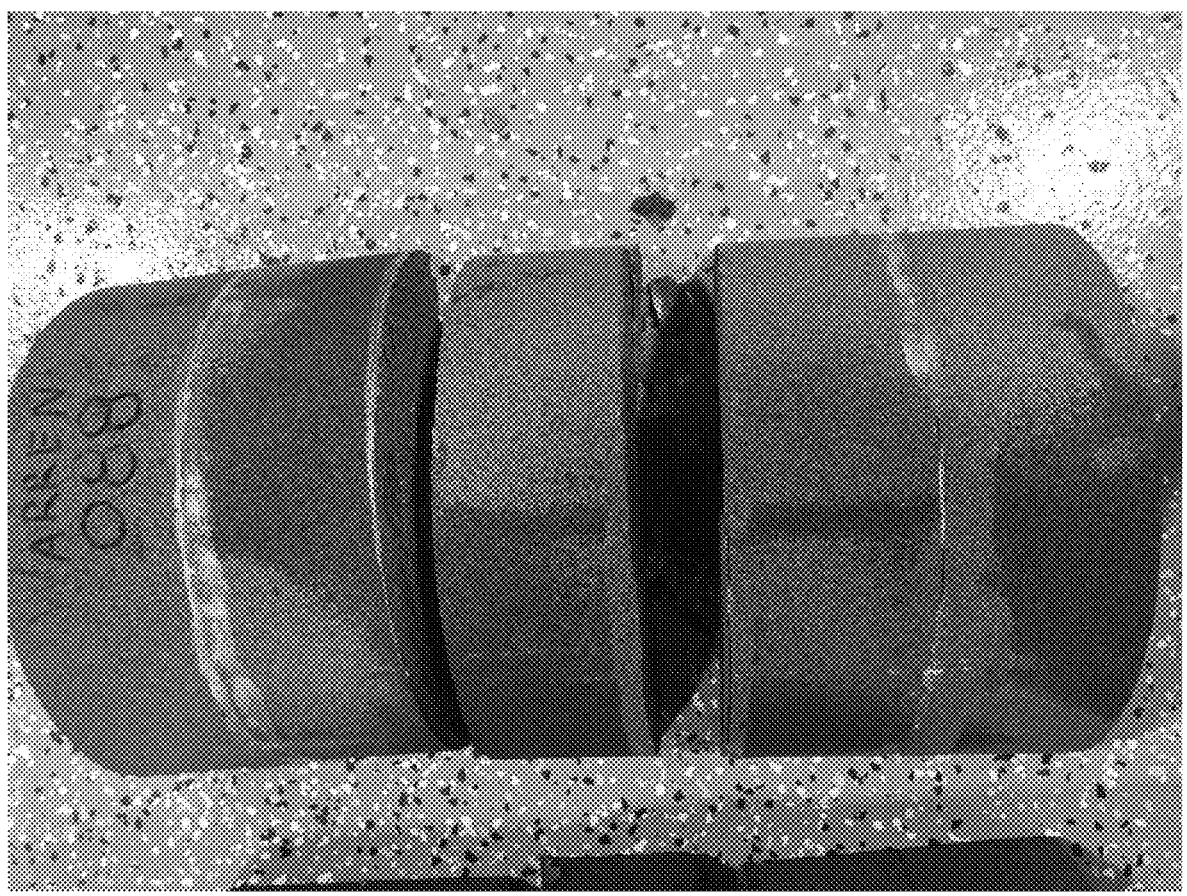
FIG. 8 shows an image of j oints after failure during a cryogenic shear test.

More specifically, the pipe is 1) cooled to −165° C., and hold at this temperature for 7-8 hours 2) allowed to warm, 3) cooled to −165° C., hold for 7-8 hours 4) allowed to warm, 5) cooled to −165° C., hold for 7-8 hours and 6) allowed to warm. This constitutes 3 runs and the pipe is then removed, and the shear test is performed. Overall, this is repeated 4 times to achieve 12 cycle runs. After warming the system to ambient temperature, the samples were pulled from the pipe and a small amount of force was applied to determine whether the joint would shear (FIG. 7 shows an example of sections prior to testing and FIG. 8 shows an example of testing failure, e.g., joint shear).

The three APAO-type Samples 1, 2 and 3 passed the −165° C. test with no shearing. Samples 4 and 5 failed after three cycles, APAO samples 1 and 2 passed 9-12 cycles whereas Sample 3 failed on one joint between cycle 9 and 12. During the −190° C. test, Samples 1 and 2 showed some superficial flaking on the inner cellular glass segment, but passed the shear test. Sample 3 failed during cycle 9 or 12 and also had flaking like sample 2. Sample 1 did not show any flaking. Both Samples 2 and 3 showed flaking on the inner layer that touches the pipe.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The cellular glass compositions, and corresponding methods of the present disclosure can comprise, consist of, or consist essentially of the essential elements and limitations of the disclosure as described herein, as well as any additional or optional ingredients, components, or limitations described herein or otherwise useful in foam glass composition applications.

The cellular glass compositions of the present disclosure may also be substantially free of any optional or selected ingredient or feature described herein, provided that the remaining composition still contains all of the required elements or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some aspects, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

The invention claimed is:

1. A cellular glass insulation system for insulating a pipe that operates at cryogenic temperatures, the system comprising a plurality of cellular glass insulation segments and an amorphous poly alpha-olefin (APAO) adhesive in an interface between adjacent cellular glass insulation segments;
   wherein each of the cellular glass insulation segments comprises two side joint sections that extend the length of the segment, an inner pipe bore, and two end joint sections; and
   wherein the APAO adhesive meets at least one of the following criteria:
   a) has an onset of melt of from about 20° C. to about 75° C.; and
   b) has a differential movement between the adhesive and the cellular glass of from about 10 mm/m to about 25 mm/m.

2. The cellular glass insulation system of claim 1, wherein the amorphous poly alpha-olefin (APAO) adhesive is applied to a side joint section and an end joint section of a cellular glass insulation segment.

3. The cellular glass insulation system of claim 1 wherein the APAO adhesive has an onset of melt of from about 20° C. to about 75° C. and has a differential movement of from about 10 mm/m to about 25 mm/m.

4. The cellular glass insulation system of claim 1 wherein the APAO adhesive has a differential movement of about 10 mm/m to about 23 mm/m.

5. The cellular glass insulation system of claim 1 wherein the APAO adhesive has a differential movement of about 12 mm/m to about 23 mm/m.

6. The cellular glass insulation system of claim 1 wherein the APAO adhesive has an onset of melt of from 25° C. to about 45° C.

7. A method of insulating a pipe, the method comprising providing a first cellular glass insulation segment, a second cellular glass segment, and a an amorphous poly alpha-olefin (APAO) adhesive, each of the first cellular glass insulation segment and the second cellular glass segment having a length an inner pipe bore, side joint sections extending the length of the cellular glass insulation segment between the inner pipe bore and an exterior surface of the cellular glass insulation segment;
   applying APAO adhesive along an interface between the first cellular glass insulation segment and the second cellular glass insulation segment; and
   positioning the cellular glass insulation segments about the exterior of a pipe or vessel;
   wherein the APAO adhesive meets at least one of the following criteria:
   a) has an onset of melt of from about 20° C. to about 75° C.; and
   b) has a differential movement between the adhesive and the cellular glass of from about 10 mm/m to about 25 mm/m.

8. The method of claim 7, wherein the APAO adhesive has an onset of melt of from about 20° C. to about 75° C. and has a differential movement of from about 10 mm/m to about 25 mm/m.

9. The method of claim 7, wherein the APAO adhesive is applied to an end joint section of at least one of the cellular glass insulation segments.

10. The method of claim 7, wherein the APAO adhesive is applied to a side joint section of at least one of the cellular glass insulation segments.

11. The method of claim 7, wherein the APAO adhesive is positioned along an interface between a side joint section and an end joint section of a cellular glass insulation segment.

12. The method of claim 7, wherein the APAO adhesive is applied along the entire length of at least one side joint section of at least one of the cellular glass segments.

13. The method of claim 7, wherein the APAO adhesive is applied along an entire length of at least one end joint section of at least one of the cellular glass segments.

14. The method of claim 7, wherein the APAO adhesive has a differential movement of about 10 mm/m to about 23 mm/m.

15. The method of claim 7, wherein the APAO adhesive has a differential movement of about 12 mm/m to about 23 mm/m.

16. The method of claim 7, wherein the APAO adhesive has an onset of melt of from 25° C. to about 45° C.

\* \* \* \* \*